United States Patent
Tabata et al.

(10) Patent No.: US 6,723,464 B2
(45) Date of Patent: Apr. 20, 2004

(54) MEMBRANE-ELECTRODE-ASSEMBLY WITH SOLID POLYMER ELECTROLYTE

(75) Inventors: Katsuyuki Tabata, Okayama (JP); Fusaki Fujibayashi, Kurashiki (JP); Masanori Aimu, Okayama (JP)

(73) Assignee: Japan Gore-Tex, Inc., Okayama-ken (JP)

(*) Notice: Subject to any disclaimer, the term of this patent is extended or adjusted under 35 U.S.C. 154(b) by 66 days.

(21) Appl. No.: 09/871,150

(22) Filed: May 31, 2001

(65) Prior Publication Data

US 2002/0071980 A1 Jun. 13, 2002

(30) Foreign Application Priority Data

May 31, 2000 (JP) ........................................ 2000-166522

(51) Int. Cl.⁷ ................................................. H01M 4/86
(52) U.S. Cl. ............................ 429/43; 429/42; 429/44; 429/30; 427/115
(58) Field of Search ............................ 429/30, 43, 42, 429/44; 427/115

(56) References Cited

U.S. PATENT DOCUMENTS

| | | | |
|---|---|---|---|
| 4,293,396 A | 10/1981 | Allen et al. .................. 204/106 |
| 5,211,984 A | 5/1993 | Wilson ........................ 427/115 |
| 5,242,765 A | 9/1993 | Naimer et al. ................ 429/42 |
| 5,521,020 A | 5/1996 | Dhar ........................... 429/142 |
| 5,547,551 A | 8/1996 | Bahar et al. ................. 204/296 |
| 5,599,614 A | 2/1997 | Bahar et al. ................. 442/171 |
| 5,607,785 A | * 3/1997 | Tozawa et al. ............... 429/33 |
| 5,702,755 A | 12/1997 | Mussell ....................... 427/115 |
| 5,707,755 A | 1/1998 | Grot ............................ 429/40 |
| 5,795,669 A | 8/1998 | Wilkinson et al. ............ 429/40 |
| 5,910,378 A | 6/1999 | Debe et al. .................. 429/42 |
| 6,042,959 A | 3/2000 | Debe et al. .................. 429/33 |
| 6,054,230 A | 4/2000 | Kato ............................ 429/23 |
| 6,103,077 A | 8/2000 | DeMarinis et al. ...... 204/290.07 |
| 6,174,616 B1 | 1/2001 | Marvin et al. ................ 429/34 |
| 6,187,468 B1 | 2/2001 | Shinkai et al. ............... 429/42 |
| 6,227,513 B1 | 5/2001 | Richard .................. 248/346.07 |

FOREIGN PATENT DOCUMENTS

| | | |
|---|---|---|
| EP | 1 063 716 | 12/2000 |
| JP | 7-220741 | 8/1995 |
| JP | 8-148167 | 6/1996 |
| JP | 8-162132 | 6/1996 |

OTHER PUBLICATIONS

"Rapid Synthesis of a Pt1Ru1/Carbon Nanocomposite Using Microwave Irradiation: A DMFC Anode Catalyst of High Relative Performance", by D. L. Boxall, G. A. Deluga, E. A. Kenik, W. D. King, and C. M. Lukehart, Dept. of Chemistry, Vanderbilt University, TN.

"Ion–Exchange Selectivity of Nafion Films on Electrode Surfaces", Marilyn N Szentirmay and Charles R. Martin, Dept. of Chemistry, Texas A&M University, as printed in Anal. Chem. 1894, Vol 56, pp. 1898–1902.

"Procedure for Preparing Solution–Cast Perfluorosulfonate Ionomer Films and Membranes", R. B. Moore, et al., as printed in Anal. Chem. Vol 58, 1986, pp. 2569–2570.

* cited by examiner

Primary Examiner—Laura Weiner
(74) Attorney, Agent, or Firm—Allan M. Wheatcraft

(57) ABSTRACT

A membrane-electrode-assembly with a solid polymer electrolyte, wherein a laminated structure is obtained by a process in which a membrane/catalyst layer conjugate produced by bonding a first catalyst layer containing a catalyst and an ion-conducting resin to a solid polymer electrolyte membrane, and a gas diffusion layer/catalyst layer conjugate produced by forming a second catalyst layer containing a catalyst and an ion-conducting resin on one side of a gas diffusion layer consisting of a gas-permeable electroconductive sheet material are laminated at least on the anode or cathode side such that the first catalyst layer and second catalyst layer face each other.

7 Claims, 3 Drawing Sheets

[Key to figure: lamination]

[Figure 1] Prior Art
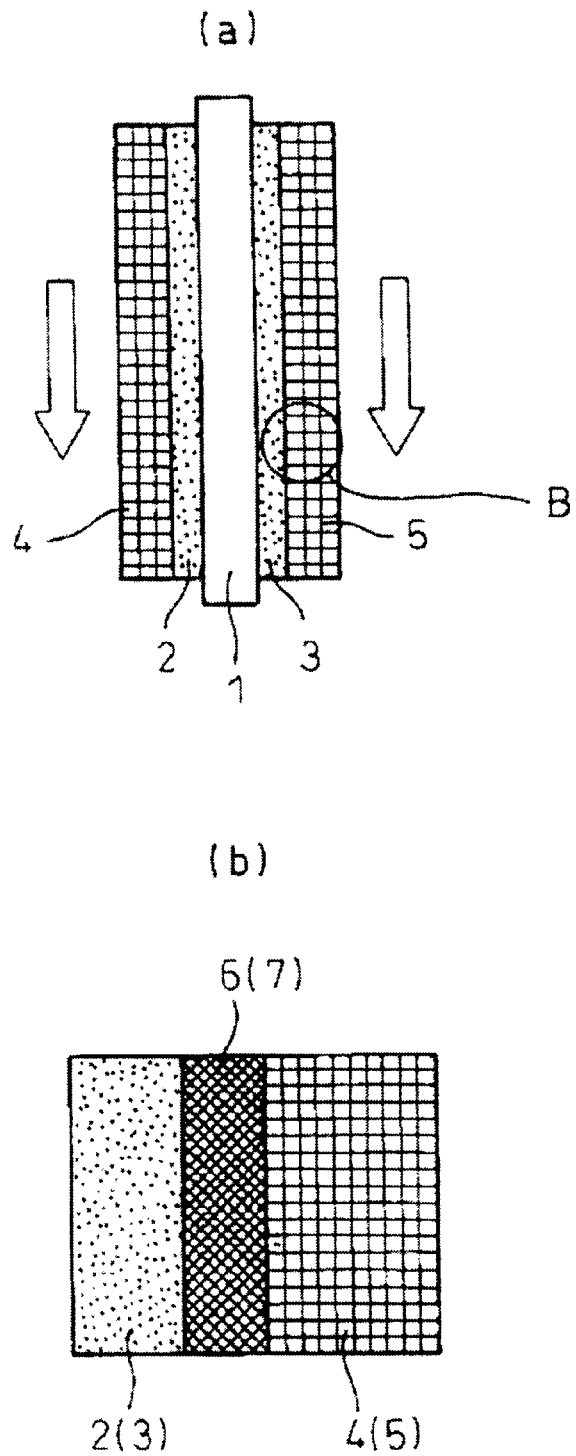
[Key to figure, left to right: anode side; cathode side]

[Figure 2] Prior Art
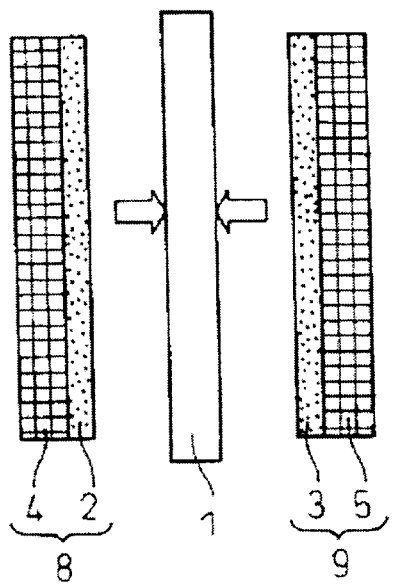
[Key to figure: hot pressing or the like]
[Figure 3] Prior Art
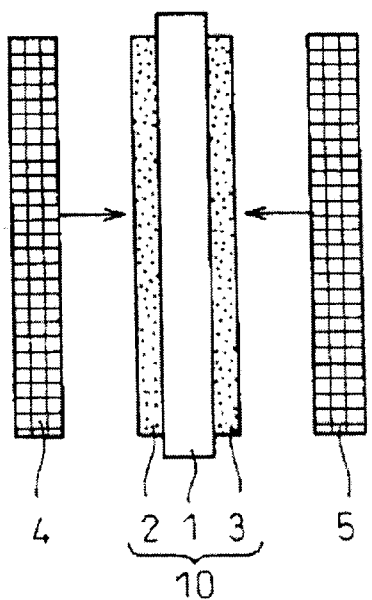
[Key to figure: lamination]

[Figure 4]
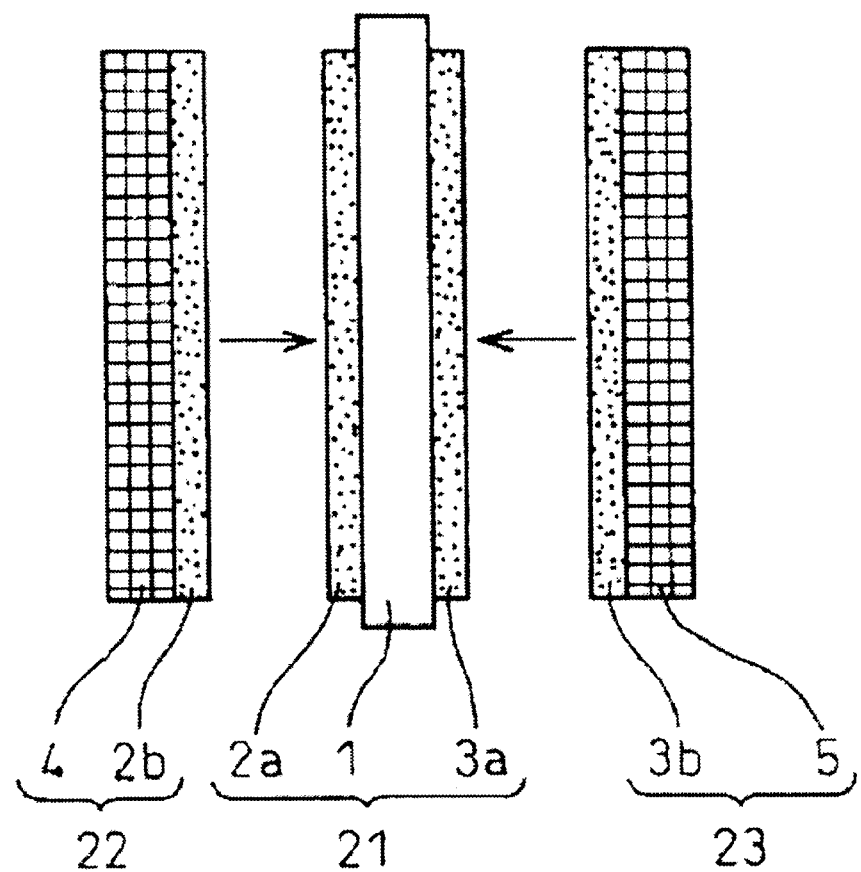
[Key to figure: lamination]

MEMBRANE-ELECTRODE-ASSEMBLY WITH SOLID POLYMER ELECTROLYTE

BACKGROUND OF THE INVENTION

The present invention relates to a membrane-electrode-assembly with a solid polymer electrolyte and to a manufacturing method thereof, and more particularly to an improved catalyst layer structure for use in a membrane-electrode-assembly with a solid polymer electrolyte.

FIG. 1(a) depicts the basic structure of a fuel cell using a membrane-electrode-assembly with a solid polymer electrolyte. A solid polymer electrolyte 1 is sandwiched between an anode 2 and a cathode 3, and gas diffusion layers 4 and 5 are formed on the outside of the anode 2 and cathode 3. On the anode side, hydrogen ions (protons) and electrons are produced by the catalyst constituting the anode 2 from a hydrogen gas fed to the anode 2 through the gas diffusion layer 4, and the resulting hydrogen ions pass through the solid polymer electrolyte 1 and form water by reacting with an oxygen gas fed to the cathode 3 via the gas diffusion layer 5 on the side of the cathode 3 and with electrons fed to the cathode 3 through outside circuitry.

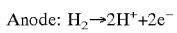

Anode: $H_2 \rightarrow 2H^+ + 2e^-$

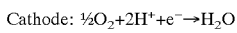

Cathode: $\frac{1}{2}O_2 + 2H^+ + e^- \rightarrow H_2O$

The solid polymer electrolyte 1 may, for example, be a solid polymer electrolyte membrane composed of a membrane based on perfluorosulfonic acid such as an ion-conducting resin typified by a Nafion® polymer. The ability to form this polymer into a membrane is well known in the art, described, for example, in "Procedure for Preparing Solution Cast Perfluorosulfonate Ionomer Films and Membranes," R. B. Moore and C. R. Martin, Anal. Chem., 58, 2569 (1986), and in "Ion Exchange Selectivity of NAFION® Films on Electrode Surfaces," M. N. Szentirmay and C. R. Martin, Anal. Chem., 56, 1898 (1984).

It is also known to form stronger and thinner ion-conducting membranes by reinforcing the ion-conducting polymer. In U.S. Pat. No. 5,547,551 and U.S. Pat. No. 5,599,614 to Bahar et al a composite structure of an ion conducting material contained in a base material characterized by the presence of nodes interconnected by fibrils is described. This membrane can be prepared much thinner than the ion-conducting polymer alone while still retaining enough strength for handling and use. These thinner membranes can offer improved cell performance because there is reduced cell resistance, and therefore less power loss during fuel cell operation.

The anode 2 and cathode 3 should preferably be composed of a catalyst capable of promoting the necessary electrode reactions. The composition of the catalyst used in the anode and cathode are well known in the art. Typically, some form of dispersed Pt is used in the anode, often in the form of Pt on carbon particles, while the catalyst in the cathode is typically also a Pt or Pt alloy, again often dispersed on finely grained carbon particles. Often, the catalyst is combined with an ion-conducting material or other binders and subsequently applied to the SPE membrane. Additionally, it is known in the art that one can also provide a catalyst-containing layer on the gas diffusion media.

The use of bi-layer electrodes have been described by Wilkinson in U.S. Pat. No. 5,795,669. Wilkinson's teachings are directed toward improved poisoning resistance. He disclosed the use of a two layer electrode, where one is specifically tailored to be electrochemically active, i.e., includes the presence of an ionomer, and one of which is specifically tailored to be active only in the gas phase, i.e., does not contain an ionomer. Wilkinson specifically teaches the advantage of this electrode arrangement for reducing the concentration of poisoning species in the gas phase. The layers are formed sequentially one on top of the other. The catalyst in each of the two layers is also different. The presence of the gas-active catalyst is taught as being capable or reducing the effect poisons present in the gas phase on the electrochemical reaction catalyst The gas diffusion layers 4 and 5 are composed of a material having electric conductivity and gas permeability, such as carbon paper, woven fabric, nonwoven fabric, or another material consisting of carbon fibers.

A membrane-electrode-assembly with a solid polymer electrolyte can be easily manufactured by a method in which a solution containing catalyst particles and an ion-conducting resin is applied to the surface of a gas diffusion layer obtained using carbon paper, woven fabric, nonwoven fabric, or another material consisting of carbon fibers; and the coated catalyst diffusion layer is dried, yielding a catalyst layer. A product (gas diffusion layer/catalyst layer conjugate) in which catalyst layers 2 and 3 containing catalyst particles and ion-conducting resins are formed on the surfaces of the gas diffusion layers 4 and 5 is commonly bonded by hot pressing or another technique on both sides of the solid polymer electrolyte membrane 1, as shown in FIG. 2. In preferred practice, a layer 6(7) composed of carbon-based particles and a fluorine-based resin (or ion-conducting resin) is disposed between the gas diffusion layer 4(5) and catalyst layer 2(3), as shown in FIG. 1(b) (fragmentary expanded view of section B in FIG. 1(a)). The same manufacturing method is used in this case. Referring again to FIG. 2, hot pressing or another technique is employed in this particular case to bond the gas diffusion layer/catalyst layer conjugate 8, 9 to the solid polymer electrolyte membrane 1 because the solid polymer electrolyte membrane 1 and the catalyst layers 2 and 3 need to be joined together with minimal contact resistance. It has therefore been proposed to use methods in which ion-conducting resin solutions are used as adhesives, methods in which the components are joined using solvents capable of dissolving solid polymer electrolyte membrane materials, and other methods in addition to the hot pressing, roll pressing, and other thermocompression methods typically employed as prior art (JP (Kokai) 7-220741, 8-148167, etc.).

The catalyst layers 2 and 3 are sometimes formed directly on the surfaces of the solid polymer electrolyte membrane 1 by spraying, screen printing, decal transfer (in which the catalyst layers are thermally transferred after being formed on PTFE sheets or the like), and other methods, as shown in FIG. 3. In such cases a membrane-electrode-assembly with a solid polymer electrolyte is constructed by combining a membrane/catalyst layer conjugate 10 with the gas diffusion layers 4 and 5.

When, however, the gas diffusion layer/catalyst layer conjugate is bonded under heat and pressure to a solid polymer electrolyte membrane after being formed, physical or chemical damage may sometimes occur as a result of heating in the membrane itself or in the gas diffusion layers during hot pressing or another type of thermocompression bonding due to the recent trend for using thinner solid polymer electrolyte membranes. Another drawback is that because this method joins the solid polymer electrolyte membrane and the catalyst layers only slightly and yields a two-dimensional contact, the high contact resistance and physical or chemical damage to the membrane itself result in the poor performance and reduced durability of the membrane-electrode-assembly. In addition, methods in which the gas diffusion layer/catalyst layer conjugate thus formed is bonded to the solid polymer electrolyte membrane with the aid of a solution or solvent are disadvantageous in that the solid polymer electrolyte membrane is dissolved in the solution or solvent and is thus more likely to be damaged, yielding a membrane-electrode-assembly whose performance is compromised in the same manner as above.

On the other hand, methods in which catalyst layers are directly formed on the surfaces of a solid polymer electrolyte membrane are expected to provide good bonding between the solid polymer electrolyte membrane and the catalyst layers and to allow membrane-electrode-assemblies to perform better than when a gas diffusion layer/catalyst layer conjugate is used.

However, even these methods fail to provide adequate joining between catalyst layers and gas diffusion layers or to bring about sufficiently low contact resistance when a membrane/catalyst layer conjugate is fabricated. A resulting drawback is that resistance increases due to the accumulation of water (flooding) along the interface with the catalyst layer on the cathode side, accompanied by impeded mass transfer of reaction gas, product water, and the like. Methods for reducing such contact resistance by raising the contact temperature or pressure during hot pressing or the like or by increasing the pressure with which membrane-electrode-assemblies are tightened during assembly have therefore been proposed in order to establish better contact between catalyst layers and gas diffusion layers, but these methods, while capable of reducing contact resistance, still fail to deliver satisfactory long-term cell performance because of the possibility that thin solid polymer electrolyte membranes can be physically or chemically damaged by heat or pressure.

Despite the art described above, there remains a distinct need within the industry for more efficient and more durable fuel cell components. In order for solid polymer electrolyte fuel cells to become widely used they must be able to operate with a high power output, and to maintain that operation with little or no degradation in performance. It is therefore an object of the present invention to provide an improved membrane electrode assembly that, when used in a fuel cell, offers both improved initial performance, and an improved ability to maintain that performance advantage. An additional object of the present invention, which was perfected in view of the drawbacks of the prior art described above, is to provide the desired high-performance, durable membrane-electrode-assembly with a solid polymer electrolyte using a manufacturing method that will reproducibly and consistently provide the desired membrane electrode assemblies.

SUMMARY OF THE INVENTION

The present invention allows the stated object to be attained in the following manner.

The instant invention is a solid polymer electrolyte membrane-electrode-assembly, comprising an anode-side gas diffusion layer, an anode catalyst layer, a solid polymer electrolyte membrane, a cathode catalyst layer, and a cathode-side gas diffusion layer in a sequential arrangement. (In the context of this invention, the membrane-electrode-assembly includes gas diffusion media as well as the membrane and the electrodes.) This membrane-electrode-assembly with a solid polymer electrolyte is characterized in that the anode or cathode catalysts region or both has at least two layers. The two layers or more layers are prepared so that at least one layer has one side attached directly or indirectly to the gas diffusion layer, and a second layer has at least one side attached directly or indirectly to the solid polymer electrolyte. Both of these layers are comprised of at least one catalyst component and at least one ionomer. This latter feature particularly distinguishes the instant invention from prior art because although prior art has described bi-layer electrodes, the use of an ionomer and a catalyst component in both layers was not taught or anticipated. Additionally, as will be described more fully below, this difference gives rise to totally unexpected performance advantages not described or anticipated previously.

When used in a fuel cell, this arrangement has, surprisingly, been found to yield fuel cells that give higher initial performance than prior art. Further, and even more surprisingly, the fuel cells using the instant invention are more stable during operation. Here stable means that the voltage decay is lower in the instant invention than in prior art. The voltage decay is the average voltage loss per unit time when the cell is operating under constant current conditions. It can be calculated using several different methods. Most simply, it is the change in voltage after some test time, t, from the initial open circuit voltage divided by the test time, t. Alternatively, it can be calculated by measuring a polarization curve at the start of a test, and then again at the end of the test. Electrochemical cell diagnostics well known in the art, for example cyclic voltammetry, may be performed if desired before obtaining each of these polarization curves. The voltage at a given current density is extracted from the two polarization curves, and the decay rate is calculated according to:

Decay Rate=(Voltage Beginning−Voltage End)/Hours of Test, where "Voltage Beginning" is the voltage extracted at a given current density from the polarization curve taken at the start of the test, and "Voltage End" is the voltage at that same current density used at the start of the test but extracted from the polarization curve taken at the end of the test. The particular method chosen to measure decay rate depends upon the nature of the testing protocol, which may depend upon the final application of the particular fuel cell being tested. To compare the stability between two different cells or two different cell configurations, it is only necessary to use the same method of calculating the decay rate between the two cells. As long as a consistent method of calculating the decay rate is used, the cell with the lower decay rate is considered to be more stable.

The lower decay rate of the instant invention is not only surprising, it is important and useful technically. One of the main limitations to prior membrane-electrode-assemblies and fuel cells that use them, is that they are not able to operate at high power outputs for long periods of time. With continued operation at a given output level as characterized by the current density, the voltage typically decreases continually, thereby eventually leading to a cell that produces little or no power. With the instant invention described herein, this limitation is greatly reduced, and therefore should allow a wider applicability for the use of membrane-electrode-assemblies in fuel cells and elsewhere.

The membrane-electrode-assembly with a solid polymer electrolyte can also be prepared such that the first catalyst layer of the membrane/catalyst layer conjugate and the second catalyst layer of the gas diffusion layer/catalyst layer conjugate are kept in contact with each other, with or without being joined. Herein, joined means brought in intimate contact using heat and/or high pressure for a period of time, for example by lamination. When the layers are not joined they are simply brought together using a relatively low mechanical force, for example by that provided during assembly of a fuel cell.

The membrane-electrode-assembly with a solid polymer electrolyte can also be prepared so that a catalyst layer of the gas diffusion layer/catalyst layer conjugate is bonded to the gas diffusion layer via a carbon-based particle layer composed of carbon-based particles and a fluororesin and disposed on one side of the gas diffusion layer. This indirect attachment of the layer to the gas diffusion media can be advantageous in certain circumstances as described more fully below. This carbon-fluororesin composite layer used for attachment can be prepared in numerous ways well known in the art, including by simple mixing and hand applications, or by using a membrane, for example expanded PTFE containing carbon.

The membrane-electrode-assembly catalysts contained in the first and/or second catalyst layer comprises particles that can be a variety of a noble metal catalyst particles, either as free standing catalyst with a high surface area, or preferably, supported on carbon particles.

The gas diffusion media (GDM) can be prepared from a gas-permeable electroconductive sheet material comprising a carbon fiber woven fabric, a carbon fiber nonwoven fabric, carbon felt, carbon paper, or any of these coated with a fluororesin containing carbon-based particles.

In another embodiment, this invention provides a method including:

a step for preparing a membrane/catalyst layer conjugate by bonding a first catalyst layer containing a catalyst and an ion-conducting resin to a solid polymer electrolyte membrane;

a step for preparing a gas diffusion layer/catalyst layer conjugate by forming a second catalyst layer containing a catalyst and an ion-conducting resin on one side of a gas diffusion layer composed of a gas-permeable electroconductive sheet material; and a step for forming a laminated structure by laminating the membrane/catalyst layer conjugate and the gas diffusion layer/catalyst layer conjugate such that the first catalyst layer and the second catalyst layer face each other, with the laminated structure being used at least on the anode or cathode side.

BRIEF DESCRIPTION OF THE DRAWINGS

FIG. 1 is a diagram depicting the basic structure of a prior art membrane-electrode-assembly with a solid polymer electrolyte.

FIG. 2 is diagram illustrating a method for manufacturing a membrane-electrode-assembly with a solid polymer electrolyte in accordance with the prior art.

FIG. 3 is diagram illustrating a method for manufacturing a membrane-electrode-assembly with a solid polymer electrolyte in accordance with the prior art.

FIG. 4 is a diagram illustrating the inventive membrane-electrode-assembly with a solid polymer electrolyte and a manufacturing method thereof.

DETAILED DESCRIPTION OF THE INVENTION

With reference to FIG. 4, the inventive membrane-electrode-assembly with a solid polymer electrolyte can be obtained by a method in which a membrane/catalyst layer conjugate 21 (which is a conjugate of a solid polymer electrolyte 1 and a first catalyst layer 2a (3a) prepared in advance in the manner described below) and a gas diffusion layer/catalyst layer conjugate 22 (23) (which is a conjugate of a gas diffusion layer 4 (5) and a second catalyst layer 2b (3b)) are mated such that the corresponding catalyst layers face each other. In the example shown in FIG. 4, the structure of the present invention is formed on both the anode side and the cathode side. Although the present invention is effective even when this structure is provided on at least one side, providing this structure on both sides is preferred.

After the membrane/catalyst layer conjugate and the gas diffusion layer/catalyst layer conjugate are mated, the first and second catalyst layers may be bonded together, particularly by using a solvent, a solution of the same material as that used for the catalyst layers, or the like. It should be noted, however, that bonding the layers under conditions that involve setting an excessively higher temperature or pressure or using a large amount of strong solvent will damage the solid polymer electrolyte membrane or the interface (bonding state) between the catalyst layer and the solid polymer electrolyte membrane, and will be more likely to compromise the merits of the present invention. The layer should therefore be bonded under conditions that exclude this kind of serious damage. Even without such bonding, the present invention will still be able to provide better cell performance and will allow this performance to remain more stable than in the past.

A first feature of the inventive membrane-electrode-assembly with a solid polymer electrolyte is that a membrane/catalyst layer conjugate comprising a catalyst layer and a solid polymer electrolyte membrane is formed by an optimum method for forming a bond between a membrane and a catalyst layer before being combined with a gas diffusion layer. Although the electrode reactions taking place in a membrane-electrode-assembly are believed to occur throughout the entire catalyst layer, most of the activity appears to be concentrated along the interface with the solid polymer electrolyte membrane, so the important features of the inventive cell are that the present invention allows the solid polymer electrolyte membrane and the catalyst layer to be efficiently joined together and that the solid polymer electrolyte membrane remains chemically or physically undamaged by the improved bonding procedure.

A second feature of the inventive membrane-electrode-assembly with a solid polymer electrolyte is that a gas diffusion layer/catalyst layer conjugate comprising a gas diffusion layer and a catalyst layer is formed by an optimum method for forming a bond between a gas diffusion layer and a catalyst layer before being combined with a solid polymer electrolyte membrane (in practice, a membrane/catalyst layer conjugate). The gas diffusion layer and catalyst layer must be securely joined together in order to obtain a membrane-electrode-assembly with a solid polymer electrolyte that has adequate initial performance and can sustain this performance for a long time, but because conventional methods featuring membrane/catalyst layer conjugates must be performed such that a membrane/catalyst layer conjugate is formed before being combined with a gas diffusion layer, damage to the solid polymer electrolyte membrane cannot be avoided when an attempt is made to establish good contact between the gas diffusion layer and the catalyst layer. With the present invention, however, good contact can be established between the gas diffusion layer and the catalyst layer, and damage to the solid polymer electrolyte membrane can be avoided when a bond is formed between the gas diffusion layer and catalyst layer while a membrane/ catalyst layer conjugate is used. For this reason, the inventive solid polymer electrolyte membrane can deliver an excellent performance for a long time.

It was discovered that because the membrane/catalyst layer conjugate and gas diffusion layer/catalyst layer conjugate used in the present invention can be kept in contact along the same catalyst layers containing a catalyst and an ion-conducting resin, low contact resistance can be maintained even when the pressure applied during fuel cell assembly (tightening) is sufficiently low to exclude damage to the solid polymer electrolyte membrane. As a result, the inventive membrane-electrode-assembly with a solid polymer electrolyte delivers a better performance (output) and is more durable than a conventional membrane-electrode-assembly with a solid polymer electrolyte.

Sufficiently low contact resistance can be established between the membrane/catalyst layer conjugate and the gas diffusion layer/catalyst layer conjugate merely by superposing and pressing together the corresponding catalyst layers in the manner described above, although the catalyst layers of the membrane/catalyst layer conjugate and gas diffusion layer/catalyst layer conjugate may be optionally bonded or otherwise joined together. Although the solid polymer electrolyte membrane in particular may be damaged in the same manner as with the prior art if the components are joined at a high temperature or pressure, the damage to the solid polymer electrolyte membrane can be avoided and better contact can be established between the catalyst layers of the membrane/catalyst layer conjugate and gas diffusion layer/ catalyst layer conjugate by bonding these catalyst layers under conditions that involve using a milder solvent or setting a lower temperature or pressure than that used to join conventional gas diffusion layer/catalyst layer conjugates and solid polymer electrolyte membranes, or membrane/ catalyst layer conjugates and gas diffusion layers.

Because the inventive membrane-electrode-assembly with a solid polymer electrolyte is obtained by forming a membrane/catalyst layer conjugate and a gas diffusion layer/ catalyst layer conjugate in advance and laminating these components in the manner described above, observations of the resulting membrane-electrode-assembly having a solid polymer electrolyte have shown that the interface between the solid polymer electrolyte membrane and the catalyst layer (first catalyst layer) has an adequate bond with the interface between the gas diffusion layer and the catalyst layer (second catalyst layer), with damage to the solid polymer electrolyte membrane minimized and a secure bond formed. Another feature of the inventive membrane-electrode-assembly with a solid polymer electrolyte is that the catalyst layer on the side of the solid polymer electrolyte membrane and the catalyst layer on the side of the gas diffusion layer are formed in advance as separate verifiable layers inside the catalyst layers interposed between the solid polymer electrolyte membrane and the gas diffusion layers, making it possible to confirm the presence of an interface between the first and second catalyst layers (or an interlying bonding region). Once a complete bond has formed between the first and second catalyst layers, the presence of a bonding surface may be impossible to confirm directly. Usually, however, such a presence can be confirmed indirectly when common bonding methods are employed.

The solid polymer electrolyte membrane used for the inventive membrane-electrode-assembly with a solid polymer electrolyte is not subject to any particular limitations and can be any ion-conducting solid polymer membrane. Typical examples include resins having sulfonic acid groups, carboxyl groups, phosphoric acid groups, phosphonic groups, and other groups, and containing fluorine-containing polymers as backbones. The thickness of the solid polymer electrolyte membrane should be reduced in order to have a greater effect on resistance and to improve performance. The membrane should have a thickness of 5–50 μm, and preferably 10–30 μm. Specific examples include Nafion™ membranes, which are polymers based on perfluorosulfonic acid and manufactured by Du Pont, and Flemion™ membranes (manufactured by Asahi Glass). Another suitable example is GORE-SELECT™ (manufactured by Japan Gore-Tex), which is a material obtained by impregnating and reinforcing a stretched porous polytetrafluoroethylene membrane with an ion-conducting resin.

The first catalyst layer is not subject to any particular limitations as long as it contains catalyst particles and an ion-conducting resin, and any conventionally known material may be used.

The catalyst commonly consists of a conductor on which catalyst particles are supported. Any catalyst particles can be used as long as they can catalyze hydrogen oxidation reactions or oxygen reducing reactions. Iron, chromium, nickel, and other elements may be used in addition to platinum and other precious metals. Carbon-based particles such as carbon black, activated carbon, and graphite are suitable as the conductor, with finely pulverized particles being particularly preferred. Materials with carbon fibers as a substrate, such as carbon paper, woven carbon fabric, and nonwoven carbon fabric, are also acceptable. Typically, particles of a noble metal (particularly platinum or alloys of platinum and other metals) are supported on carbon black particles with a specific surface area of 20 $m^2/g$ or greater. Preferably, the catalyst is the same catalyst material in both the first and second catalyst layers, but the catalyst is preferably present in different compositions in each layer.

The ion-conducting resin in a catalyst layer is a binder material for supporting the catalyst and forming the layer. The resin also serves to provide channels for the migration of ions and other species produced by the catalyst. The ion-conducting resin may be the same resin as described above with reference to the solid polymer electrolyte membrane.

The first catalyst layer should preferably be made into a porous catalyst layer in order to ensure maximum contact between the catalyst and the hydrogen gas or other fuel gas at the anode, or the oxygen gas or other oxidizer gas on the cathode. The catalyst content of a catalyst layer should be 0.01–1 $mg/cm^2$, and preferably 0.1–0.5 $mg/cm^2$.

The first catalyst layer can be bonded to the solid polymer electrolyte membrane by any method capable of providing good bonding (improved connection, low contact resistance) without damaging the solid polymer electrolyte membrane. No limitations are imposed, and it is possible to use screen printing techniques or techniques (decal methods) in which catalyst layers are thermally transferred onto a solid polymer electrolyte membrane after being formed on PTFE sheets or the like.

An adequate membrane/catalyst layer conjugate can be obtained using a stretched porous polytetrafluoroethylene (PTFE) film in accordance with the technique described in JP (Kokai) 8-162132.

Specifically, the technique involves preparing a stretched porous PTFE film whose pore diameter allows components of an ion-conducting resin to pass through the material but blocks catalyst components and other solid components;

depositing components for forming a catalyst layer on one side of the stretched porous PTFE film by coating the film surface with an ink or paste containing at least an ion-conducting resin and a catalyst as the components for forming a catalyst layer (or by filtering a solution or dispersion containing the components for forming a catalyst layer); and removing the solvent or dispersant thereafter. The reverse side of the stretched porous PTFE film covered with the components for forming a catalyst layer is then further coated or impregnated with the ion-conducting resin, and the solvent is removed, yielding a membrane/catalyst layer conjugate. The stretched porous PTFE film used herein functions as a substrate for forming a solid polymer electrolyte membrane.

The membrane/catalyst layer conjugate of the present invention may also be obtained by preparing a solid polymer electrolyte membrane in advance and forming catalyst layers on the surface thereof. Specifically, the membrane/catalyst layer conjugate may be obtained by impregnating the voids of a stretched porous PTFE film with an ion-conducting resin solution in advance (an alternative is to bring the material into a semidry state by removing the solvent in an appropriate manner, or to remove the solvent completely), whereupon the surface of the product thus prepared is coated with an ink or paste containing at least a catalyst and an ion-conducting resin, and the solvent is then removed. It is indispensable for the ink or paste used herein to contain an ion-conducting resin because otherwise it is impossible to form a complete bond between the catalyst layers and the solid polymer electrolyte membrane (in which a stretched porous PTFE film serves as a substrate), creating a need for heat pressing.

With either method, the structure of the ion-conducting resin is stabilized and its adhesive power enhanced by thoroughly heating the material to a temperature of about 120–180° C. after the solvent has been removed.

In the inventive membrane-electrode-assembly with a solid polymer electrolyte, a structure obtained by laminating a membrane/catalyst layer conjugate and a gas diffusion layer/catalyst layer conjugate is provided at least on the anode or cathode side. When this structure is provided on both the cathode and anode side, it is necessary to form catalyst layers on both sides of the solid polymer electrolyte membrane to fabricate a membrane/catalyst layer conjugate. In this case, a catalyst layer/membrane/membrane/catalyst layer conjugate can be obtained by a method in which two such membrane/electrode conjugates are prepared, an appropriate amount of ion-conducting resin solution is applied to the membrane-side surface, the ends of the conjugates are joined together, the solvent is removed, and the assembly is heated.

Alternatively, an ink or paste containing a catalyst, an ion-conducting resin, PTFE, and other components for forming catalyst layers is applied to both sides of a stretched porous PTFE film whose voids have been impregnated with an ion-conducting resin solution, to both sides of an impregnated film from which the solvent has been removed, or to both sides of a film coated with the ion-conducting resin solution following solvent removal. The solvent is then removed from the coated film, and the product is heat-treated.

In the membrane/catalyst layer conjugates thus obtained, the membranes and the catalyst layers are bonded together in a state of good adhesiveness after the formation of the membranes or catalyst layers, with the result that high adhesive power is achieved between the membranes and the catalyst layers even in the absence of heat pressing or the like, and that low contact resistance can be established. In addition, using a stretched porous PTFE film as a substrate for a solid polymer electrolyte membrane makes it possible to maintain constant membrane thickness and to form a membrane that has high strength despite being thin.

Although the inventive membrane/catalyst layer conjugate can be fabricated in the manner described above, it is also possible to use a stretched porous PTFE film as a substrate for the solid polymer electrolyte membrane and to employ PRIMEA 5510 (manufactured by Japan Gore-Tex) as a material in which this membrane is integrated with a catalyst layer.

The gas diffusion layer is composed of a gas-permeable electroconductive sheet material. Typical examples include materials obtained by performing a water repellency treatment on carbon paper, woven carbon fabric, nonwoven carbon fabric, carbon felt, and other gas-permeable electroconductive substrates. It is also possible to use porous sheets comprising carbon-based particles and fluororesins. Such porous sheets may, for example, be obtained by fashioning carbon black into sheets with the aid of polytetrafluoroethylene as a binder.

Although the second catalyst layer, which is formed on one side of a gas diffusion layer, may have the same composition as the first catalyst layer, it is also possible to optionally employ a different composition or manufacturing method. It is also possible to provide multiple layers greater than two, such that at least one layer is attached either directly or indirectly to the gas diffusion media, while at least one layer is attached either directly or indirectly to the solid polymer electrolyte.

Similarly, the catalyst layers (first and second catalyst layers) interposed between the anode and cathode may be provided with the same compositions and be fabricated by the same manufacturing method, but there is no particular reason for the same compositions or manufacturing methods to be used.

The second catalyst layer may be formed on the gas diffusion layer in accordance with a conventional technique, and a good bond can be established because the second catalyst layer and the gas diffusion layer are bonded in advance by hot pressing or another high-temperature, high-pressure treatment. Although it is possible, for example, to adopt a method in which hot pressing is performed as needed after the gas diffusion layer has been coated with a solution containing an ion-conducting resin and catalyst particles for forming the catalyst layer, the preferred option is to form a porous layer comprising carbon-based particles and a fluororesin or ion-conducting resin on the surface of the gas diffusion layer, and to form the second catalyst layer thereon. The porous layer may, for example, be formed by a method in which a mixture of carbon black and fluororesin (water-repellent binder) is made into a paste by using water as a dispersant; the paste is applied to a fluororesin release film; carbon paper or another gas diffusion layer (sheet material) is placed on the film surface; the components are integrated together by heating; and the release film is peeled off, yielding a porous layer composed of carbon black and fluororesin on the gas diffusion layer. Alternatively, the paste can be applied directly to a carbon fiber woven fabric that has been rendered water-repellent to prevent the paste from penetrating inside, and the coated fabric can be dried and heat-treated to provide the surface with a porous layer consisting of carbon black and fluororesin. The mixing ratio (weight ratio) of fluororesin and carbon black should be set to between 10:90 and 60:40, and preferably between 20:80 and 50:50. The fluororesin can be PTFE, PFA, FEP, ETFE, or the like According to another alternative, a mixture of carbon black and ion-conducting resin is applied directly to the surface of a gas diffusion layer (gas-permeable electroconductive sheet material), and the system is heated to about 80–100° C. to remove the solvent, providing the surface with a porous layer comprising carbon black and ion-conducting resin. The mixing ratio (weight ratio) of ion-conducting resin and carbon black should be set to between 10:90 and 50:50.

A second catalyst layer is formed on the surface (porous layer side) of the resulting gas diffusion layer covered with a porous layer that contains carbon-based particles and a fluororesin or ion-conducting resin. The second catalyst layer is formed by a method in which an ink or paste containing at least a catalyst and an ion-conducting resin is prepared in the above-described manner, a coating is formed, and the solvent is removed. The structure of the ion-conducting resin is stabilized and its adhesive power enhanced by thoroughly heating the material to a temperature of about 120–180° C. after the solvent has been removed. The catalyst content of the second catalyst layer should be 0.01–1 mg/cm$^2$, and preferably 0.05–0.5 mg/cm$^2$.

Interposing a porous layer comprising carbon-based particles and a fluororesin or ion-conducting resin in this manner is expected to afford better gas diffusion and a smoother surface, resulting, among other things, in better bonding between the catalyst layer and the gas diffusion layer. Finally, bonding should preferably be further improved by hot pressing or the like, but this condition is not essential.

EXAMPLES

Example 1

The membrane/catalyst layer conjugate used was PRIMEA 5510™ (manufactured by Japan Gore-Tex), which is a membrane/catalyst layer conjugate obtained by disposing catalyst layers (platinum content: 0.3 mg/cm$^2$) on both sides of a GORE-SELECT™ membrane (solid polymer electrolyte membrane manufactured by Japan Gore-Tex) with a thickness of 30 μm.

A platinum-carbon catalyst obtained by supporting 30 wt % platinum on carbon black was dispersed in IPA, a perfluorosulfonic acid resin solution was added, and the resulting liquid dispersion (containing the perfluorosulfonic acid resin and platinum-carbon catalyst in a 30:70 proportion) was made into a paste by vaporizing the solvent to the desired viscosity. The paste was applied by screen printing to one side (commonly the side facing the catalyst layer) of a surface-treated gas diffusion layer (CARBEL-CFP™, manufactured by Japan Gore-Tex) in which carbon paper was used as the substrate, and the solvent was removed by air drying. Two items obtained by forming a catalyst layer (platinum content: 0.1 mg/cm$^2$) on one side of CARBEL-CFP™ were prepared, yielding gas diffusion layer/catalyst layer conjugates.

The gas diffusion layer/catalyst layer conjugates were superposed on both sides of the membrane/electrode conjugate such that the catalyst layers faced each other, yielding the basic structure of a membrane-electrode-assembly with a solid polymer electrolyte.

Example 2

The membrane/catalyst layer conjugate was PRIMEA 5510™ (manufactured by Japan Gore-Tex), which is a membrane/catalyst layer conjugate obtained by disposing catalyst layers (platinum content: 0.3 mg/cm$^2$) on both sides of a GORE-SELECT™ membrane (solid polymer electrolyte membrane manufactured by Japan Gore-Tex) with a thickness of 30 μm.

A platinum-carbon catalyst obtained by supporting 30 wt % platinum on carbon black was dispersed in IPA, a perfluorosulfonic acid resin solution was added, and the resulting liquid dispersion (containing the perfluorosulfonic acid resin and platinum-carbon catalyst in a 30:70 proportion) was made into a paste by vaporizing the solvent to the desired viscosity. The paste was applied by screen printing to one side (commonly the side facing the catalyst layer) of a surface-treated gas diffusion layer (CARBEL-CL™, manufactured by Japan Gore-Tex) in which carbon fiber woven fabric was used as the substrate, and the solvent was removed by air drying. Two items obtained by forming a catalyst layer (platinum content: 0.1 mg/cm$^2$) on one side of CARBEL-CL™ were prepared, yielding gas diffusion layer/catalyst layer conjugates.

The gas diffusion layer/catalyst layer conjugates were superposed on both sides of the membrane/electrode conjugate such that the catalyst layers faced each other, yielding the basic structure of a membrane-electrode-assembly with a solid polymer electrolyte.

Comparative Example 1

A GORE-SELECT™ membrane (manufactured by Japan Gore-Tex) with a thickness of 30 μm was used as the solid polymer electrolyte membrane.

Catalyst layers were formed by the same catalyst layer formation method as in Working Example 1 on the surfaces of the CARBEL-CFP™ used in Working Example 1, yielding gas diffusion layer/catalyst layer conjugates.

The aforementioned gas diffusion layer/catalyst layer conjugates were bonded by hot pressing (150° C., 10 kgf/cm$^2$, 3 minutes) to both sides of the GORE-SELECT™ membrane, yielding the basic structure of a membrane-electrode-assembly with a solid polymer electrolyte.

Comparative Example 2

The basic structure of a membrane-electrode-assembly with a solid polymer electrolyte was prepared in the same manner as in Comparative Example 1 except that CARBEL-CL ™ was used instead of the CARBEL-CFP™ gas diffusion layer employed in Comparative Example 1.

Comparative Example 3

Catalyst layers were formed on PTFE sheets by the same catalyst layer formation method as in Working Example 1, the materials were dried and bonded by hot pressing (150° C., 10 kgf/cm$^2$, 3 minutes) to both sides of a GORE-SELECT™ membrane with a thickness of 30 μm, and the PTFE sheets were peeled off, yielding a membrane/catalyst layer conjugate.

Carbon paper that had been rendered water-repellent was bonded by hot pressing (150° C., 10 kgf/cm$^2$, 3 minutes) to both sides of the membrane/catalyst layer conjugate, yielding the basic structure of a membrane-electrode-assembly with a solid polymer electrolyte.

Comparative Example 4

The basic structure of a membrane-electrode-assembly with a solid polymer electrolyte was prepared in the same manner as in Comparative Example 3 except that CARBEL-CL™ was used instead of the CARBEL-CFP™ gas diffusion layer employed in Comparative Example 3.

Hydrogen gas and air were fed to the anode and cathode sides, respectively, of membrane-electrode-assemblies with solid polymer electrolytes obtained using basic structures fabricated in accordance with Working Examples 1–2 and Comparative Examples 1–4, and initial cell performance and changes in performance over time were evaluated using a device for evaluating membrane-electrode-assemblies with solid polymer electrolytes. Specifically, a membrane-electrode-assembly with a solid polymer electrolyte in which each electrode had an area of 25 cm² was used to perform measurements under conditions in which the cell portion of the membrane-electrode-assembly with a solid polymer electrolyte was constantly heated to 80° C., the hydrogen gas and air were humidified by being bubbled through water kept at 80° C., and flow rates corresponding to a current density of 0.5 A/cm² were set such that the utilization ratios of hydrogen and air in relation to their theoretical flow rates were 80% and 40%, respectively. In practice, cell performance was evaluated at a hydrogen gas flow rate of 109 cc/min and an air flow rate of 544 cc/min. Initial cell performance was evaluated based on the voltage achieved after the cell had operated for 24 hours at a current density of 0.5 A/cm². Changes in performance over time were expressed as the extent of voltage reduction observed after the cell had continuously operated for 1000 hours at 0.5 A/cm². Here, the average decay rate is calculated as the change in voltage from the initial performance over the time of the test divided by the number of hours of the test, and is expressed in $\mu$V/hr.

The results are shown in Table 1.

TABLE 1

|  | Initial performance (at 0.5 A/cm²) | Change over time (after 1000 hours) | Average Decay Rate ($\mu$V/hr) |
| --- | --- | --- | --- |
| Example 1 | 0.71 V | 100 mV | 100 |
| Example 2 | 0.71 V | 100 mV | 100 |
| Comparative Example 1 | 0.61 V | 150 mV | 150 |
| Comparative Example 2 | 0.62 V | 200 mV | 200 |
| Comparative Example 3 | 0.66 V | 250 mV | 250 |
| Comparative Example 4 | 0.67 V | 300 mV | 300 |

As can be seen in Table 1, the present invention yields a membrane-electrode-assembly with a solid polymer electrolyte that can deliver high output density initially in a fuel cell, while, surprisingly, giving a lower average decay rate than prior art.

Examples 3–4 and Comparative Examples 5–8

In this series of tests, six fuel cells were constructed to further illustrate the inventive aspects of our membrane-electrode-assembly under different conditions in a fuel cell, and to illustrate the effect of force applied during assembly on fuel cell performance. In Examples 3–4 and Comparative Examples 5–8, cells were constructed using a PRIMEA™ 5510 electrode (manufacturing by Japan Gore-Tex Inc.) with a Pt loading of 0.4 mg Pt/cm² as both anode and cathode; a 25 m Gore-Select™ membrane (prepared according to the teachings of Bahar et al in U.S. Pat. No. 5,599,614) as the electrolyte; and Carbel CL® gas diffusion media (GDM) (available from Japan Gore-Tex, Inc) on both the anode and cathode sides. Cell sizes in all cases were 25 cm². The assembly procedure for the cells was as follows:

a) A 25 $\mu$m thick GORE-SELECT™ membrane (available from Japan-Gore-Tex, Inc.) was placed between two PRIMEA™ 5510 electrodes (available from Japan Gore-Tex, Inc.) and pressed between platens with the top platen heated to 160 degrees C. A piece of 0.25" thick GR® sheet (available from W. L. Gore & Associates, Elkton, Md.) was placed between each platen and the electrode. 15 tons of pressure were applied for 3 minutes to the system to bond the electrodes to the membrane. Two cells were prepared simultaneously in the press.

b) A 25 cm² triple serpentine channel design flowfield (provided by Fuel Cell Technologies, Inc, Albuquerque, N.Mex.) was placed on a workbench.

c) A window-shaped CHR (Furon) cohrelastic silicone coated fabric gasket (provided by Tate Engineering Systems, Inc., Baltimore, Md.) sized so a 25 cm² GDM will fit inside it was placed on top of the flow field.

d) One piece of Carbel CL® GDM was placed inside the gasket.

e) Another window-shaped gasket of polyethylene napthalate (PEN) film (available from Tekra Corp., Charlotte, N.C.) sized so it slightly overlapped the GDM on all sides was placed on top of the GDM.

f) The anode/membrane/cathode system prepared in (a) was placed on top of gasket.

g) Steps (b) through (e) were repeated in reverse order to form the cathode compartment.

h) The cell was placed in a vice and the eight retaining bolts were tightened 45 in-lbs.

In the case of Examples 3–4, the Carbel CL® GDM used in the cell was coated as described in Example 2, while in Comparative Examples 5–8, the Carbel CL® GDM was uncoated. The amount of force used in step (h) above was determined by measuring the thickness of the four gaskets used in the cell and the thickness of the two GDM sheets before assembly. The average GDM compression reported in Table 2 below is calculated as the difference in thickness of the sum of the gasket thicknesses and the sum of the initial thicknesses of the two GDM divided by the sum of the initial thickness of the two GDM. It is reported on a percent basis to allow comparison between cells.

The cells were tested in a fuel cell at a cell temperature of 70 degrees C. with 100 percent relative humidity inlet gases on both the anode and cathode. The gas applied to the anode was laboratory grade hydrogen supplied at a flow rate of 1.2 times greater than what is needed to maintain the rate of hydrogen conversion in the cell as determined by the current in the cell (i.e., 1.2 times stoichiometry). Filtered compressed air was supplied to the cathode at a flow rate of two times stoichiometry. The cells were "broken-in" for 14 hours The break-in process involved cycling the cell at 60 degrees C. between a set current density of 0.6 A/cm² for 15 minutes, 1.0 A/cm² for 15 minutes and open-circuit for one minute for a period of 6 hours. Then a polarization curve was taken by controlling the applied current density beginning at 0.6 A/cm² and then stepping the current density in 0.2 A/cm² increments upward to 1.4 A/cm² and back downward to zero (open circuit voltage) recording the steady state voltage at each potential. Then, the cell was operated for another approximately 7 hours under the same cycling conditions, but at 70 degrees C., after which another polarization curve using the same procedure as before was taken. The cathode flow was then switched to nitrogen for two hours, and a cyclic voltammogram was taken by sweeping the voltage at 100 mV/s between 0.1 V and 1.2 V three times and dynamically measuring the current during the sweeps. Finally, the cathode flow was switched back to air for 10–15 minutes and a polarization curve obtained as before. The voltage recorded at 0.8 A/cm$^2$ during this polarization curve is indicative of the initial performance (as tabulated in Table 2). The current was set to 0.8 A/cm$^2$ and the cell was operated at 70 degrees C. using the gas conditions described above for 300 hours. A polarization curve was taken as before and the voltage at 0.8 A/cm$^2$ was recorded. This value is tabulated in Table 2 as the performance loss after 300 hours. Finally an average decay rate was calculated by dividing the voltage loss after 300 hours by the time of the test (i.e., 300).

Comparing Example 3 and 5 to Comparative Example 5–8 shows that under these operating conditions the inventive product has a more stable cell voltage during operation in a fuel cell, i.e., has a lower average decay rate, than the prior art regardless of the force applied during assembly. Furthermore, comparing Comparative Example 5 and Comparative Example 6 to Example 3, and Comparative Example 7 and Comparative Example 8 to Example 4 shows that not only is the average decay rate lower for the inventive product, it is less sensitive to the force applied during assembly than prior art.

TABLE 2

| | average GDM compression (%) | initial performance at 800 mA/cm2 (V) | performance loss after 300 hrs (mV)* | Average Decay Rate ($\mu$V/hr)* |
|---|---|---|---|---|
| Comparative Example 5 | 28% | 0.673 | 42.3 | 141 |
| Example 3 | 30% | 0.662 | 1.8 | 6 |
| Comparative Example 6 | 32% | 0.669 | 23.0 | 76.7 |
| Comparative Example 7 | 41% | 0.689 | 9.7 | 32.3 |
| Example 4 | 44% | 0.636 | −6.6 | −22 |
| Comparative Example 8 | 47% | 0.661 | 10.5 | 35 |

*A negative value indicates that the measured cell voltage after 300 hours was higher than the voltage measured initially.

While the present invention has been described in connection with certain preferred embodiments and examples, it is not intended to be limited thereby.

What is claimed is:

1. A solid polymer electrolyte membrane-electrode assembly comprising an anode-side gas diffusion layer, an anode catalyst region, a solid polymer electrolyte membrane, a cathode catalyst region, and a cathode-side gas diffusion layer in a sequential arrangement, wherein either the anode catalyst region or the cathode catalyst region or both comprise:

(a). at least two catalyst layers wherein one catalyst layer has a side attached to said solid polymer electrolyte membrane and another catalyst layer has a side attached to one of said cathode-side or anode-side gas diffusion layers, and wherein an interface between said two catalyst layers lies between the solid polymer electrolyte and said one of the gas diffusion layers;

(b). wherein said catalyst layers each comprise at least one catalyst and at least one ion-conducting material;

(c). wherein said at least one catalyst in each of said at least two catalyst layers comprise substantially the same material; and (d). wherein the ionomer concentration of said at least two catalyst layers is substantially the same.

2. A solid polymer electrolyte membrane-electrode-assembly as defined in claim 1, wherein the ion-conducting material in at least one of said catalyst layers comprises an ion conducting polymer.

3. A solid polymer electrolyte membrane-electrode-assembly as defined in claim 1, wherein one of said catalyst layers is bonded to one of said cathode-side or anode-side gas diffusion layers via a carbon-based particle layer comprising carbon-based particles and a fluororesin.

4. A solid polymer electrolyte membrane-electrode-assembly as defined in claim 1, wherein said at least one catalyst comprises particles of a noble metal supported on carbon-based particles.

5. A solid polymer electrolyte membrane-electrode-assembly as defined in claim 1, wherein said cathode-side and anode-side gas diffusion layers are selected from the group consisting of a carbon fiber woven fabric, a carbon fiber nonwoven fabric, carbon felt, carbon paper, and any of the above having a coating of a fluororesin containing electroconductive particles.

6. A fuel cell comprising at least one polymer electrolyte membrane-electrode assembly as defined in claim 1.

7. A method for manufacturing a electrolyte membrane-electrode assembly with a solid polymer electrolyte, an anode-side gas diffusion layer, an anode catalyst layer, a solid polymer electrolyte membrane, a cathode catalyst layer, and a cathode-side gas diffusion layer in a sequential arrangement, wherein said method comprises the steps of:

preparing a membrane/catalyst layer conjugate by bonding a first catalyst layer containing a catalyst and an ion-conducting resin to said solid polymer electrolyte membrane;

preparing a gas diffusion layer/catalyst layer conjugate by forming a second catalyst layer containing a catalyst and an ion-conducting resin on one side of said gas diffusion layer; wherein said second catalystlayer has substantially the same ionomer concentration as said first catalyst layer; and forming a two-layer catalyst region by joining the membrane/catalyst layer conjugate and the gas diffusion layer/catalyst layer conjugate such that the first catalyst layer and the second catalyst layer face each other, with said two-layer catalyst region being used as either the anode catalyst layer or cathode catalyst layer.

* * * * *